US009949311B2

(12) United States Patent
Zhao et al.

(10) Patent No.: US 9,949,311 B2
(45) Date of Patent: Apr. 17, 2018

(54) APPARATUS, SYSTEM AND METHOD FOR VOLTE CALL CONTINUITY

(71) Applicant: APPLE INC., Cupertino, CA (US)

(72) Inventors: Yingjie Zhao, Pleasanton, CA (US); Wanping Zhang, San Jose, CA (US); Li Su, San Jose, CA (US)

(73) Assignee: APPLE INC., Cupertino, CA (US)

( * ) Notice: Subject to any disclaimer, the term of this patent is extended or adjusted under 35 U.S.C. 154(b) by 155 days.

(21) Appl. No.: 14/604,351

(22) Filed: Jan. 23, 2015

(65) Prior Publication Data
US 2016/0219644 A1 Jul. 28, 2016

(51) Int. Cl.
 H04W 76/02 (2009.01)
(52) U.S. Cl.
 CPC ....... H04W 76/028 (2013.01); H04W 76/022 (2013.01)
(58) Field of Classification Search
 CPC .......................... H04W 76/028; H04W 76/022
 See application file for complete search history.

(56) References Cited

U.S. PATENT DOCUMENTS

| 2005/0054298 A1* | 3/2005 | Chen ................ H04W 76/068 455/67.11 |
| 2013/0016658 A1* | 1/2013 | Lovsen .............. H04W 76/028 370/328 |
| 2014/0064209 A1* | 3/2014 | Anchan ............. H04W 72/0406 370/329 |
| 2014/0219248 A1* | 8/2014 | Reddiboyana ........ H04W 36/14 370/331 |
| 2015/0124588 A1* | 5/2015 | Hallenstal ........... H04L 65/1016 370/221 |
| 2015/0124699 A1* | 5/2015 | Chebolu ............... H04W 28/06 370/328 |
| 2015/0124718 A1* | 5/2015 | Molinero Fernandez .......... H04L 65/1016 370/329 |
| 2016/0021587 A1* | 1/2016 | Vargantwar .......... H04W 36/14 370/331 |
| 2016/0142931 A1* | 5/2016 | Mondal ................ H04L 67/141 370/252 |

* cited by examiner

*Primary Examiner* — Tejis Daya
(74) *Attorney, Agent, or Firm* — Fay Kaplun & Marcin, LLP (57) ABSTRACT

A system, apparatus and method to maintain continuity of a Voice over Long Term Evolution (LTE) (VoLTE) call. The system includes a first user equipment (UE) configured to perform a (VoLTE) call and a second UE configured to perform the VoLTE call with the first UE. The UE's are configured to maintain continuity of the VoLTE call by determining when one of a first dedicated bearer linked to a first default bearer of the first UE or a second dedicated bearer linked to a second default bearer of the second UE is lost and transmitting a signal to an Internet Protocol (IP) Multimedia Subsystem (IMS) server that prevents release of the determined dedicated bearer, the signal further triggering a re-activation of the determined dedicated bearer.

20 Claims, 9 Drawing Sheets

APPARATUS, SYSTEM AND METHOD FOR VOLTE CALL CONTINUITY

BACKGROUND INFORMATION

A first station may be configured to communicate wirelessly with a second station. Specifically, the first station may transmit data to and receive data from the second station through a wired or wireless communications network. The first and second stations may use the network to communicate using a variety of different applications. For example, the first station may be a mobile originating (MO) user equipment (UE) while the second station may be a mobile terminating (MT) UE for a voice call. The voice call may be performed in a variety of different manners. For example, when the MO or MT UE is connected to a legacy network, the voice call may be performed using circuit switching. In another example, when the MO or MT UE is connected to an Internet Protocol (IP) data transmission network, the voice call may be performed using Voice over IP (VoIP). More specifically, when the network is a Long Term Evolution (LTE) network, the VoIP call may be a Voice over LTE (VoLTE) call.

When the VoLTE call is performed, the MO and MT UEs may perform a setup procedure. Initially, when the MO and MT UEs connect to the LTE network, each UE may be associated with one or more default bearers that provide a best effort service in the exchange of data with the LTE network. Furthermore, when a particular application is being utilized such as the VoLTE call, each UE may be associated with a dedicated bearer that provides a dedicated tunnel for data to be transmitted with regard to the VoLTE call (e.g., the voice data). The dedicated bearer may provide a variety of functionalities such as improving throughput or guaranteeing a bit rate for the data to be transmitted. However, during the VoLTE call, the MO and/or the MT UE may experience a disruption such as a radio link failure (RLF) that causes the dedicated bearer to be lost. When the dedicated bearer is lost, the VoLTE call may be dropped.

SUMMARY

A first exemplary embodiment is directed to a system having a first user equipment (UE) configured to perform a Voice over Long Term Evolution (LTE) (VoLTE) call and a second UE configured to perform the VoLTE call with the first UE. The first UE is configured to maintain continuity of the VoLTE call by determining when one of a first dedicated bearer linked to a first default bearer of the first UE or a second dedicated bearer linked to a second default bearer of the second UE is lost and transmitting a signal to an Internet Protocol (IP) Multimedia Subsystem (IMS) server that prevents release of the determined dedicated bearer, the signal further triggering a re-activation of the determined dedicated bearer.

Another exemplary embodiment is directed to a user equipment having a transceiver configured to establish a connection with a Long Term Evolution (LTE) Network and a processor configured to execute a Voice over LTE (VoLTE) call application with a further user equipment. The transceiver and processor are configured to maintain continuity of the VoLTE call by determining when one of a first dedicated bearer linked to a first default bearer of the user equipment and a second dedicated bearer linked to a second default bearer of the further user equipment is lost and transmitting a signal to an Internet Protocol (IP) Multimedia Subsystem (IMS) server that holds the determined dedicated bearer from release, the signal further triggering a re-activation of the determined dedicated bearer.

A further exemplary embodiment is directed to a method performed by a first user equipment (UE) configured to perform a Voice over Long Term Evolution (LTE) (VoLTE) call with a second UE. The method includes determining when one of a first dedicated bearer linked to a first default bearer of the first UE or a second dedicated bearer linked to a second default bearer of the second UE is lost and transmitting a signal to an Internet Protocol (IP) Multimedia Subsystem (IMS) server that delays release of the determined dedicated bearer, the signal further triggering a re-activation of the determined dedicated bearer, the re-activation of the determined dedicated bearer maintaining continuity of the VoLTE call.

A further exemplary embodiment is directed to a method performed by a first user equipment (UE) configured to perform a Voice over Long Term Evolution (LTE) (VoLTE) call with a second UE. The method includes performing the VoLTE call with the second UE using a first dedicated bearer linked to a first default bearer associated with a first evolved Node B (eNB) of the LTE network, establishing a connection to the LTE network via the second eNB, the second eNB assigning a second default bearer to the first UE, determining that the second eNB has not configured a second dedicated bearer linked to the second default bearer for the first UE, and transmitting a signal to an Internet Protocol (IP) Multimedia Subsystem (IMS) server that triggers a setup procedure for the second eNB to establish the second dedicated bearer for the first UE, the establishment of the second dedicated bearer maintaining a VoLTE call continuity.

DETAILED DESCRIPTION

The exemplary embodiments may be further understood with reference to the following description and the related appended drawings, wherein like elements are provided with the same reference numerals. The exemplary embodiments are related to a system and method for maintaining a call continuity during a Voice over Long Term Evolution (LTE) (VoLTE) VoLTE call when experiencing a variety of conditions where a dedicated bearer may be lost. Specifically, one of the user equipment (UE) in the VoLTE call may be configured to perform a respective functionality based upon the different conditions to maintain the call continuity where the conditions may relate to the UE itself or to the other UE of the VoLTE call.

Figure 1:
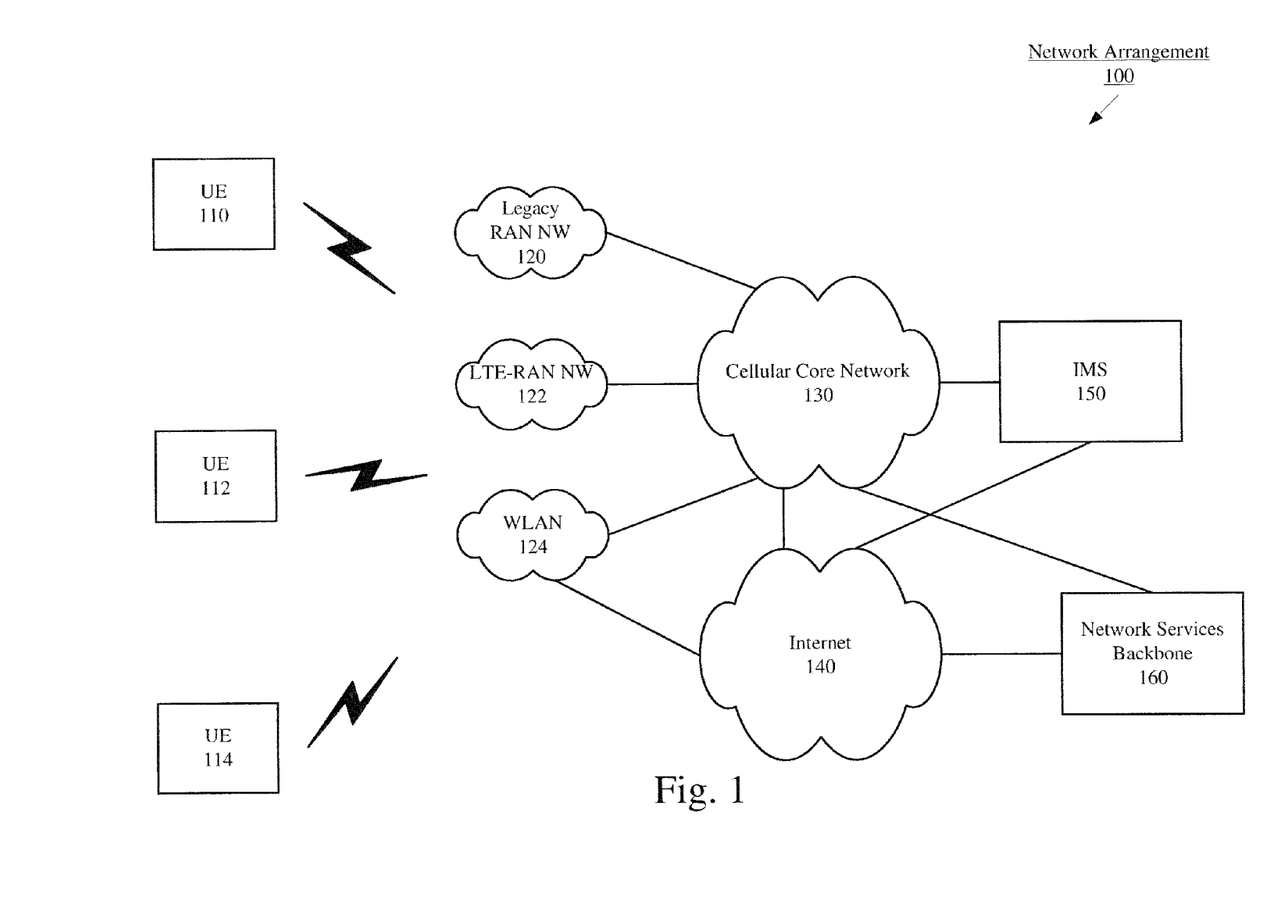
FIG. 1 shows an exemplary network arrangement.

FIG. 1 shows an exemplary network arrangement 100. The exemplary network arrangement 100 includes UEs 110-114. In this example, it is assumed that a respective, different user is using each of the UEs 100-114. For example, a first user may be utilizing the UE 110, a second user may be utilizing the UE 112, and a third user may be utilizing the UE 114. Those skilled in the art will understand that the UEs 110-114 may be any type of electronic component that is configured to communicate via a network, e.g., mobile phones, tablet computers, desktop computers, smartphones, phablets, embedded devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes. However, as will be understood from the description herein, the exemplary embodiments may relate to when at least two UEs 110-114 are present in the network arrangement 100.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to perform VoLTE calls with other UEs. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 performing a VoLTE call. For example, the UE 110 may be a mobile originating (MO) UE that invites a further UE such as the UE 112, which may be a mobile terminating (MT) UE. Initially, the UEs 110-114 establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific base station (e.g., an eNB of the LTE-RAN 122).

When the UEs 110-114 associate and establish a connection with the LTE-RAN 122, one or more default bearers may be established for the UE 110-114. Initially, a bearer may define how data is treated when transmitted through the network. That is, the bearer may be a set of network parameters that define data specific treatment by type or association with an application. Accordingly, the LTE-RAN 122 may treat a first type of data in a first way and treat a second type of data in a second way. For example, the first type of data may be prioritized so that the LTE-RAN 122 treats this data in a special manner. It should be noted that the bearer may also define the treatment based upon user identity or other identification parameters.

One type of bearer that is established when initially connecting to the LTE-RAN 122 is a default bearer. The LTE-RAN 122 via the associated eNB may assign the default bearer, which remains so long as the UE is connected to the LTE-RAN 122. The default bearer may be a best effort service for the data transmitted through the LTE-RAN 122. Thus, depending upon various network conditions currently being experienced by the LTE-RAN 122, the data being transmitted through the default bearer may be given whatever resources are available. The default bearer may be associated with a particular IP address and a single UE may have further default bearers established. Each default bearer may be assigned a quality of service (QoS) class indicator (QCI) of 5 to 9 that relates to non-guaranteed bit rate (GBR) bearers. Applications that may utilize the default bearer may be those in which the delivery of data is less time sensitive. For example, signaling messages such as Session Initiation Protocol (SIP) may utilize the default bearer. Other examples include smartphone traffic including video, chat, email, browsing, etc.

A further type of bearer that may be established between the UE and the LTE-RAN 122 is a dedicated bearer. The dedicated bearer may provide a dedicated tunnel to specific traffic. One application that utilizes the dedicated tunnel is VoLTE voice data used when performing the VoLTE call. The dedicated bearer may be an additional bearer over the default bearer that is established at a time subsequent to the default bearer being established (e.g., upon performing the VoLTE call). Since only default bearers require separate IP addresses and the dedicated bearer is provided over an established default bearer, the dedicated bearer does not require a separate IP address. However, the dedicated bearer is linked to the default bearer established previously. Specifically, a value defined during setup of the dedicated bearer may be used to link the dedicated bearer to the default bearer. The dedicated bearer may utilize the same QCI as the default bearer but may also utilize a different QCI that relates to a GBR bearer. The dedicated bearer may use traffic flow templates (TFT) to provide the special treatment to specific services such as the VoLTE call. That is, the TFT may also define the rules of when the dedicated bearer is to be used based upon the application being executed.

When considering the operation of the default bearer and the dedicated bearer, the default bearer is established upon the UE connecting to the LTE-RAN 122. Specifically, the LTE-RAN 122 assigns the default bearer to the UE. Subsequently, while still connected to the LTE-RAN 122, the UE may execute the VoLTE call functionality. For example, the UE 110 may be the MO UE while the UE 112 may be the MT UE. As such, the MT UE may also be connected to the LTE-RAN 122 and have a default bearer assigned and established. When the VoLTE call functionality is performed, various signaling messages are transmitted between the UE 110 and the UE 112 via the LTE-RAN 122 and the IMS 150 through the respective default bearer. Once the VoLTE call has been established from successfully transmitting the different signaling messages, the UE 110 and the UE 112 may be connected to each other to perform the VoLTE call. Specifically, the dedicated bearer may be established for each of the UE 110 and the UE 112 for the VoLTE data to be transmitted.

When a connection to the LTE-RAN 122 with more particular emphasis on the eNB to which the UE is associated is maintained, the VoLTE call may be performed without any issues until its completion. However, those skilled in the art will understand that there may be any number of conditions that may be present while the VoLTE call is being performed. The conditions may relate to a variety of physical or environmental factors or may relate to procedural aspects of network management.

In a first example, the UE 110 may experience a connection failure such as when a radio link failure (RLF) occurs. When the RLF happens, the dedicated bearer may become lost. When the dedicated bearer is lost, the VoLTE call may be dropped. The UE 110 may attempt to re-establish a connection with the LTE-RAN 122 and/or the dedicated bearer. If the reestablishment fails, the UE 110 may enter a radio resource control (RRC) idle state in which the LTE-RAN 122 releases the dedicated bearer. With no dedicated bearer, the VoLTE call drops. Even though the UE 110 may be capable of establishing a RRC connection at a later time, the LTE-RAN 122 may not configure the UE 110 with the dedicated bearer. If the reestablishment succeeds, the UE 110 may remain in a RRC connected state. However, the providers of the LTE-RAN 122 may have configured the network to still release the dedicated bearer context on the network side. When released, the UE 110 waits without any ability to perform an action until the Real-Time Transport Protocol (RTP)/RTP Control Protocol (RTCP)) times out that results in the VoLTE call being dropped.

In a second example, the UE 112 (i.e., the other UE involved in the VoLTE call) may experience a connection failure such as the RLF. In a substantially similar situation, when the UE 112 has lost its dedicated bearer, the VoLTE call may still be dropped despite the UE 110 maintaining its established dedicated bearer. With no recourse, the UE 110 may again be forced to wait without performing an action until the RTP/RTCP times out on the UE 112 side that results in the VoLTE call being dropped.

In a third example, the UE 110 may remain connected to the LTE-RAN 122 but may re-associate with a different eNB. For example, the UE 110 may move and perform a roaming procedure. However, when roaming and changing the eNB to which the UE 110 is associated, a new default bearer is established. Furthermore, because any dedicated bearer that is established is linked to the default bearer, a new default bearer requires a new dedicated bearer as well. Thus, when performing the VoLTE call and performing a roam, the dedicated bearer being used may be lost. When lost, again, the VoLTE call may be dropped.

The exemplary embodiments incorporate these various conditions and provide a mechanism to maintain VoLTE call continuity. As will be described in further detail below, the UE 110 (acting as the MO UE) may be configured with a first mechanism when experiencing its own RLF, a second mechanism when determining a likelihood that the UE 112 (acting as the MT UE) is experiencing a RLF, and a third mechanism when the UE 110 (acting as the MO UE) is performing a roam procedure. In each of these scenarios, the respective mechanism may enable the UE side and the network side to be prepared to maintain the VoLTE call continuity, particularly through re-activating the dedicated bearer when lost.

Figure 2:
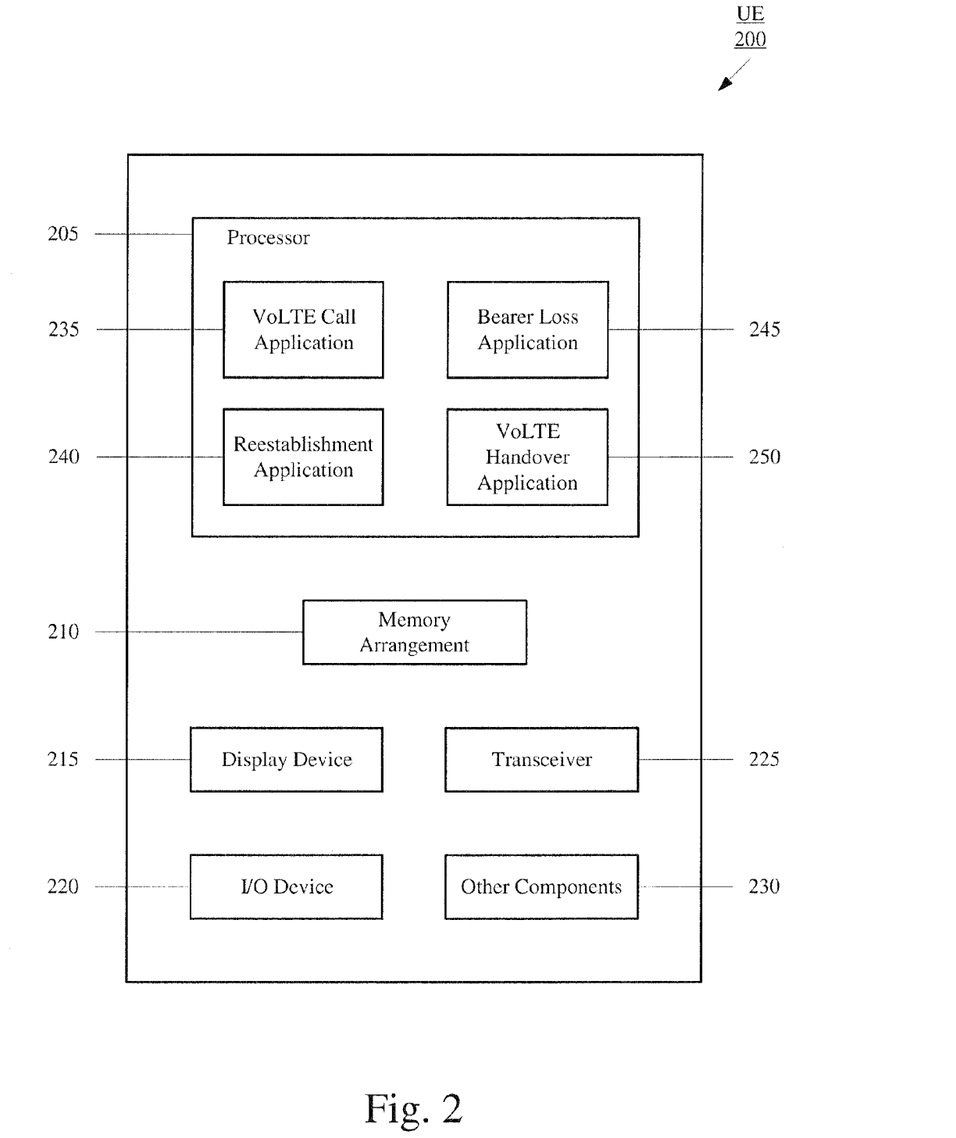
FIG. 2 shows an exemplary user equipment configured with dedicated bearer functionalities.

FIG. 2 shows an exemplary UE 200 configured with dedicated bearer functionalities. Specifically, the UE 200 is configured to execute a plurality of applications that perform the respective functionalities when experiencing a potential loss of the dedicated bearer. For exemplary purposes, the UE 200 may represent the UE 110 that is one party to the VoLTE call. Those skilled in the art will understand that the UE 200 may also represent the other UEs 112, 114. However, it should be noted that the other UEs 112, 114 may not necessarily be capable of performing the functionalities described below with regard to the UE 110.

The UE 200 may represent any electronic device that is configured to perform wireless functionalities and may be representative of one or more of the UEs 110-114. For example, the UE 200 may be a portable device such as a smartphone, a tablet, a phablet, a laptop, etc. In another example, the UE 200 may be a client stationary device such as a desktop terminal. The UE 200 may be configured to perform cellular and/or WiFi functionalities. The UE 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 200 to other electronic devices, etc.

The processor 205 may be configured to execute a plurality of applications of the UE 200. For example, the applications may include a web browser when connected to a communication network via the transceiver 225. As such, when connected to the LTE-RAN 122, the data for the web browser may utilize the default bearer. In another example, the processor 205 may execute a VoLTE call application 235 that enables the UE 200 to perform a VoLTE call functionality such as with the UE 112. In yet another example, the processor 205 may execute a reestablishment application 240. As will be described in further detail below, the reestablishment application 240 may provide a mechanism to transmit a preparation signal so that the dedicated bearer is re-activated despite the UE 110 experiencing a RLF. In a further example, the processor 205 may execute a bearer loss application 245. As will be described in further detail below, the bearer loss application 245 may provide a mechanism for the UE 110 to determine whether the UE 112 is experiencing a RLF to transmit a signal that re-activates the dedicated bearer for the UE 112. In a still further example, the processor 205 may execute a VoLTE handover application 250. As will be described in further detail below, the VoLTE handover application 250 may provide a mechanism for the UE 110 to determine capabilities of the roamed access point and transmit a signal to transfer the VoLTE call with a further established dedicated bearer.

It should be noted that the above noted applications each being an application (e.g., a program) executed by the processor 205 is only exemplary. The functionality associated with the applications may also be represented as a separate incorporated component of the UE 200 or may be a modular component coupled to the UE 200, e.g., an integrated circuit with or without firmware. In addition, in some UEs, the functionality described for the processor 205 is split among two processors, a baseband processor and an applications processor. The exemplary embodiments may be implemented in any of these or other configurations of a UE.

The memory 210 may be a hardware component configured to store data related to operations performed by the UE 200. Specifically, the memory 210 may store data related to the various applications 235-250. For example, the VoLTE call application 235 may utilize a phone book functionality that stores contact information for other users and UEs. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the VoLTE call functionality. Thus, an antenna (not shown) coupled with the transceiver 225 may enable the transceiver 225 to operate on the LTE frequency band.

Figure 3:
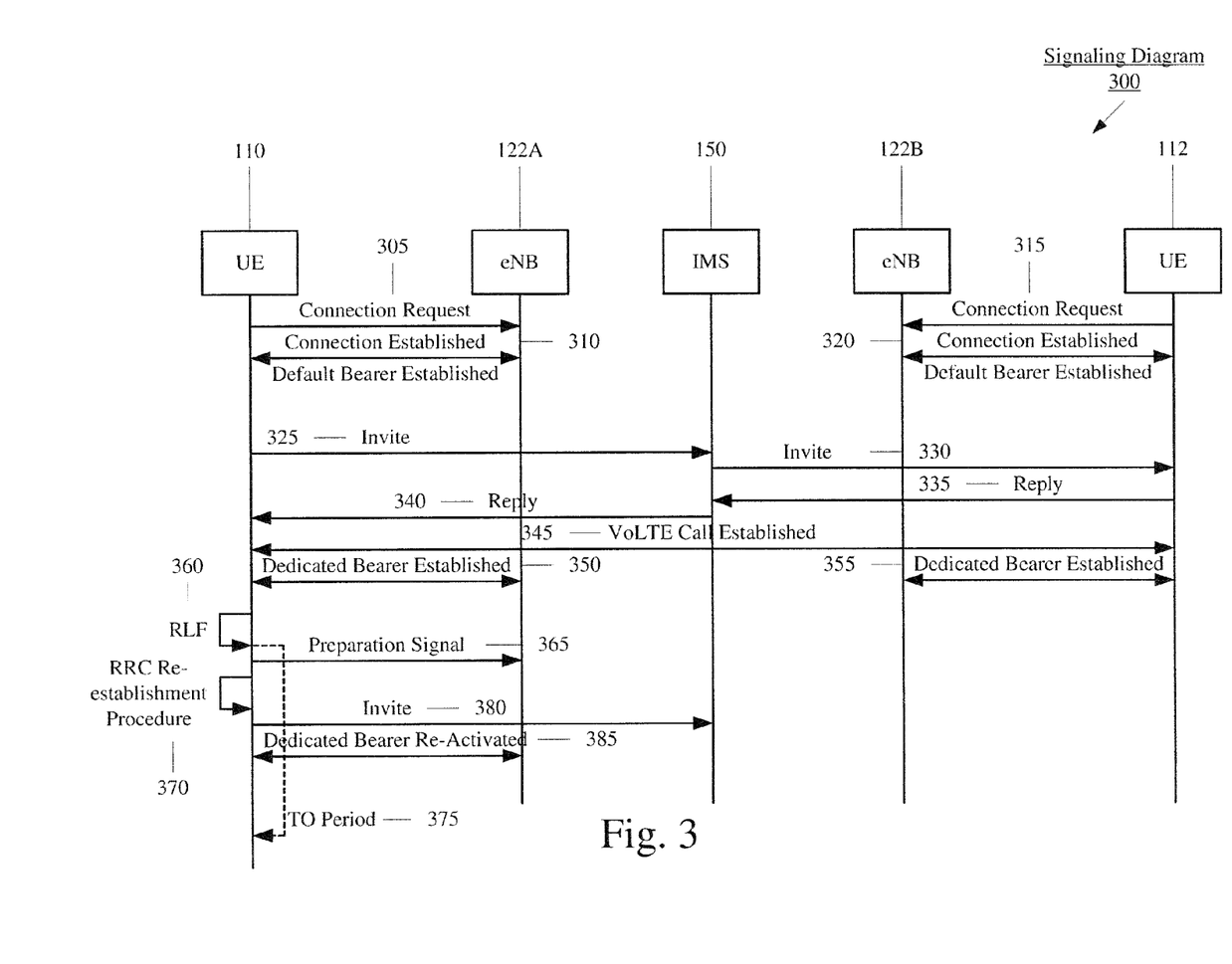
FIG. 3 shows a first exemplary signaling diagram for re-activating a dedicated bearer.

FIG. 3 shows a first exemplary signaling diagram 300 for re-activating a dedicated bearer. Specifically, the signaling diagram 300 relates to when the UE 110 executes the reestablishment application 240. Accordingly, the signaling diagram 300 further relates to when the UE 110 experiences a RLF that results in the dedicated bearer being lost. It may be assumed that the other UE 112 does not experience any conditions that result in a loss of its dedicated bearer on its end such that the reestablishment application 240 is capable of maintaining the call continuity.

The signaling diagram 300 illustrates a generic procedure to first connect to the LTE-RAN 122 by both the UE 110 and the UE 112. The signaling diagram 300 also assumes that the UE 110 and the UE 112 are located in different operating areas of the LTE-RAN 122 such that the UE 110 connects to the LTE-RAN 122 via an eNB 122A while the UE 112 connects to the LTE-RAN 122 via an eNB 122B. Therefore, the UE 110 may detect the presence of the LTE-RAN 122 and transmit a connection request 305 to the eNB 122A. Upon performing an association procedure, the UE 110 may establish a connection 310 to the LTE-RAN 122 via the eNB 122A. Furthermore, upon establishing the connection the LTE-RAN 122, the eNB 122A may assign a default bearer for the UE 110 and establish the default bearer. A substantially similar operation may be performed for the UE 112 with the eNB 122B, (e.g., connection request 315 and connection establishment 320 with a default bearer).

With both the UE 110 and the UE 112 connected to the LTE-RAN 122, the UE 110 may execute the VoLTE call application 235. When initiating the VoLTE call, the VoLTE call application 235 of the UE 110 may be used where contact information for the client station 350 is used to generate an invite. Those skilled in the art will understand that the VoLTE call functionality is an operation supported by the IMS 150. Therefore, the IMS 150 is also shown in the signaling diagram 300. Accordingly, the invite 325 is transmitted from the UE 110 to the IMS 150 (e.g., via the eNB 122A and the LTE-RAN 122) and the invite 330 is then transmitted from the IMS 150 to the UE 112. It should be noted that the invite 325, 330 is transmitted from the UE 110 to the IMS 150 and ultimately to the UE 112 through various networks and network components. However, for illustrative purposes, only the end points of the transmission of the invite 325, 330 are shown in the signaling diagram 300, particularly from the UE 110 to the IMS 150 and from the IMS 150 to the UE 112. It should be noted that the UE 110 being the MO UE and the UE 112 being the MT UE is only exemplary and an opposite configuration may also be used.

In a substantially similar manner, the reply signal 335 may be transmitted from the UE 112 to the IMS 150 and the reply 340 is then transmitted from the IMS 150 to the UE 110. Subsequently, the VoLTE call 345 may be established between the UE 110 and the UE 112. Once the VoLTE call has been established, the eNB 122A may assign and establish a dedicated bearer 350 for the UE 110 for use during the VoLTE call while the eNB 122B may assign and establish a dedicated bearer 355 for the UE 112 for use during the VoLTE call.

As discussed above, the UE 110 may experience a loss of the dedicated bearer from a variety of conditions such as from a RLF 360. The RLF 360 may be triggered due to any number of reasons including an indication from the radio link control (RLC) that a maximum number of retransmissions has been reached, upon expiry of a timer, a random access issue from the media access control (MAC), etc. The UE 110 may be configured to detect the RLF 360 and perform subsequent procedures.

According to the exemplary embodiments, one such procedure performed by the reestablishment application 240 is to generate a preparation signal 365 that is transmitted to the eNB 122A. Therefore, upon detection of the RLF 360, the reestablishment application 240 generates the preparation signal 365. More specifically, the reestablishment application 240 may operate with the baseband layer of the UE 110 to notify the eNB 122A that the RLF 360 occurred. When the eNB 122A receives the preparation signal 365 from the UE 110, the eNB 122A may be notified that the RLF 360 occurred but also be notified of a desire of the UE 110 to keep or trigger the network to reestablish/reactivate the dedicated bearer. Thus, the preparation signal 365 may also serve to prepare the eNB 122A for subsequent steps that are to be performed.

Further procedures that are performed upon detecting the RLF 360 may include performing RRC reestablishment procedures 370. The RRC reestablishment procedures 370 are performed to reestablish signaling radio bearer operations and reactive security algorithms. Specifically, the RRC reestablishment procedure 370 entails performing a plurality of operations (e.g., starting/stopping/suspending timers, resetting the MAC, etc.) on the UE side and transmitting a RRC reestablishment message to the eNB 122A. The RRC reestablishment message may include UE context information such as physical cell identification, a reason for the request, etc. The RRC reestablishment procedure 370 is only successful when the eNB 122A has a valid UE context. Thus, when the UE 110 receives a response indicating a successful RRC reestablishment, the UE 110 may perform subsequent operations (e.g., stopping a timer, reestablishing PDCP, reestablishing RLC, etc.).

As discussed above, regardless of whether the RRC reestablishment procedure 370 is successful, the dedicated bearer 350 that is in use for the VoLTE call may still be lost either from a UE side or from a network side. Specifically, when the RRC reestablishment procedure 370 fails, the UE 110 enters the RRC idle state and loses the dedicated bearer 350. When the RRC reestablishment procedure 370 succeeds, the network may release the dedicated bearer 350 upon the RLF 360 occurring. However, the reestablishment application 240 of the exemplary embodiments has already transmitted the preparation signal 365 so that the dedicated bearer 350 is not released by the LTE-RAN 122.

The reestablishment application 240 may perform a common operation to re-activate the dedicated bearer under two circumstances having different states. When the RRC reestablishment procedure 370 fails, the UE 110 enters the RRC idle state. There may be a timeout (TO) period 375 (shown as dotted period in the signaling diagram 300) in which the dedicated bearer 350 becomes lost. Prior to this TO period 375 expiring, the reestablishment application 240 may transmit an invite message 380 to the IMS 150. The invite message 380 may be a SIP message invite. Those skilled in the art will understand that the SIP message invite may trigger the RRC connection request. However, with the dedicated bearer 350 not being released, the UE 110 may have the dedicated bearer re-activated 385 prior to the TO period 375 for the VoLTE call to continue. When the RRC reestablishment procedure 370 succeeds, the UE 110 may remain in the RRC connected state. There may be a respective TO period 375 for this process as well. Prior to this TO period 375 expiring, the reestablishment application 240 may again transmit a SIP message invite 380 that triggers the RRC connection request to re-activate 385 the dedicated bearer and continue the VoLTE call.

Since the LTE-RAN 122 has not yet cleared or released the dedicated bearer context, the SIP message invite 380 transmitted to the IMS 150 by the reestablishment application 240 may lead the LTE-RAN 122 to keep the context further. Despite the LTE-RAN 122 clearing the context, the SIP message invite 380 triggers the LTE-RAN 122 to re-activate the dedicated bearer for the UE once again. Accordingly, the UE 110 may continue the VoLTE call with the UE 112 after the RLF has happened.

Figure 4:
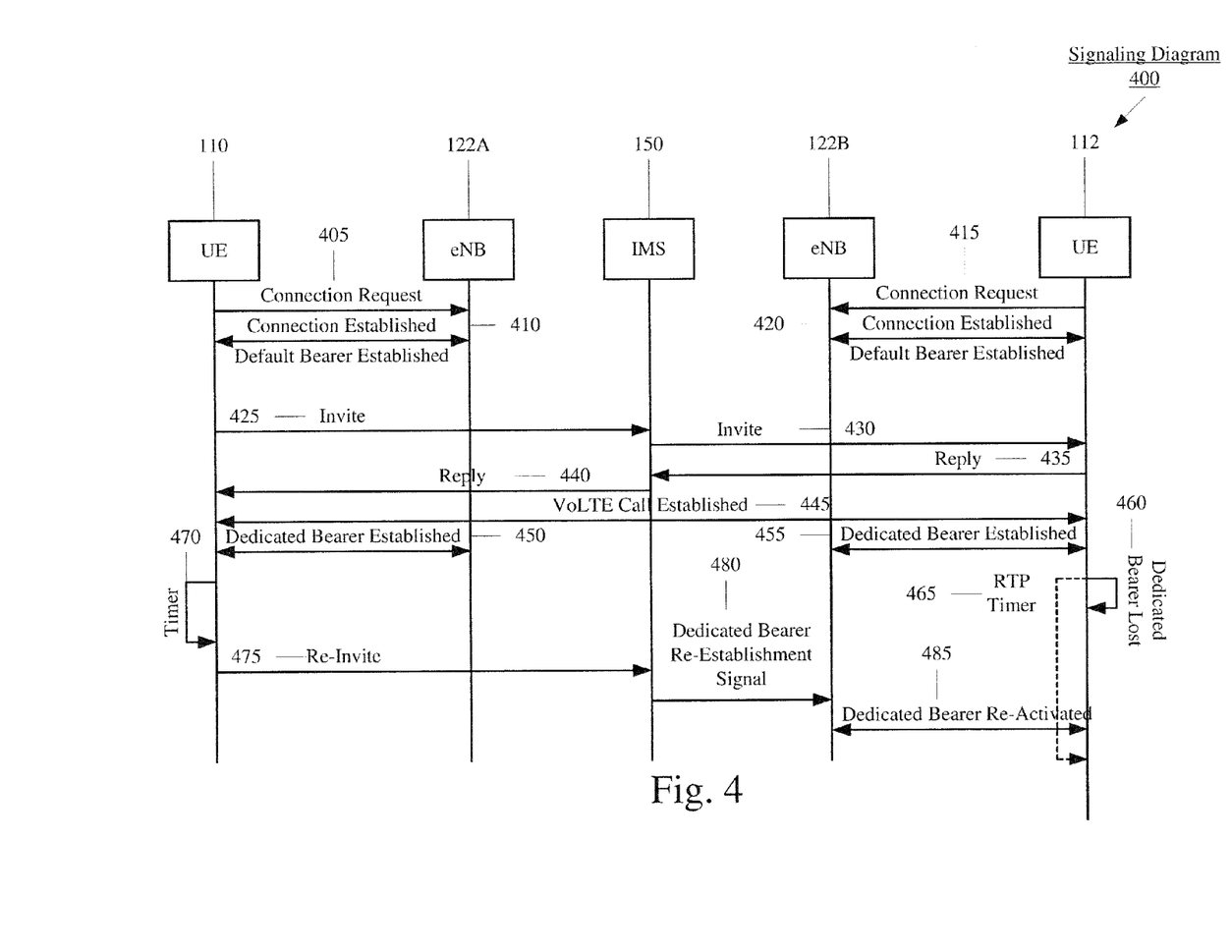
FIG. 4 shows a second exemplary signaling diagram for re-activating a dedicated bearer.

FIG. 4 shows a second exemplary signaling diagram 400 for re-activating a dedicated bearer. Specifically, the signaling diagram 400 relates to when the UE 110 executes the bearer loss application 245. Accordingly, the signaling diagram 400 further relates to when the UE 112 experiences a RLF that results in the dedicated bearer being lost. It may be assumed that the UE 110 does not experience any conditions that result in a loss of its dedicated bearer on its end such that the bearer loss application 245 is capable of maintaining the call continuity.

Initially, the signaling diagram 400 also illustrates signals and messages 405-455 transmitted by the UEs 110 and 112 to establish a connection to the LTE-RAN 122 via the respective eNB 122A and eNB 122B, respectively, establish a respective default bearer, establish the VoLTE call, and establish a respective dedicated bearer for the VoLTE call.

As discussed above, the UE 112 may experience a loss 460 of the dedicated bearer 455 from a variety of conditions such as from a RLF. According to the exemplary embodiments, the bearer loss application 245 of the UE 110 may monitor when RTP packets are being received for the VoLTE call. Those skilled in the art will understand that RTP defines a standardized packet format for delivering voice data for the VoLTE call. Therefore, there may be a RTP timer 465 associated with the VoLTE call for both UEs 110 and 112 (in the signaling diagram 400 of FIG. 4, the RTP timer 465 is only shown for UE 112, but it should be considered that UE 110 may also implement an RTP timer). For example, the RTP timer 465 may be between 6 to 10 seconds. The RTP timer 465 may be selected by the bearer loss application 245 to provide a base time in which a further predetermined timer 470 is used. Again, the further predetermined timer 470 is only shown for UE 110 in the signaling diagram 400 of FIG. 4, but it should be considered that UE 112 may also implement a further predetermined timer. The further predetermined timer 470 may be a value less than the selected RTP timer 465. Thus, when the bearer loss application 245 sets the RTP timer 465 to 10 seconds, the further predetermined timer 470 may be set to 8 seconds.

Using the above noted example of 10 seconds set for the RTP timer 465 and 8 seconds for the predetermined timer 470, the bearer loss application 245 may determine a likelihood that the UE 112 is experiencing a dedicated bearer loss issue. Specifically, if the UE 110 does not receive downlink RTP packets within 8 seconds (the predetermined timer 470), the bearer loss application 245 may assume that the UE 112 is experiencing the dedicated bearer loss issue. Upon expiry of the predetermined timer 470, the bearer loss application 245 may be configured to notify the IMS 150 that the UE 112 is experiencing the dedicated bearer loss issue by transmitting a re-invite message 475. Specifically, the re-invite message 475 may be a SIP message re-invite. In a substantially similar manner discussed above with regard to the SIP message invite 380 relating to the signaling diagram 300, the SIP message re-invite 475 may include the proper parameters. This SIP message re-invite 475 may trigger the dedicated bearer reestablishment of the UE 112 side. Therefore, the UE 110 transmits the re-invite message 475 to the IMS 150. The IMS 150 in turn transmits the dedicated bearer reestablishment signal 480 to the eNB 122B such that the dedicated bearer is reactivated 485 for the UE 112. That is, the dedicated bearer of the UE 112 is not released and the call continuity may be maintained so long as the process is performed prior to the expiry of the RTP timer 465 that may also represent a TO period. Accordingly, the UE 110 may detect possible dedicated bearer loss problems of the other UE 112 and help to notify the LTE-RAN 122, the corresponding eNB, and the IMS 150 so that the VoLTE call may be continued.

Figure 5:
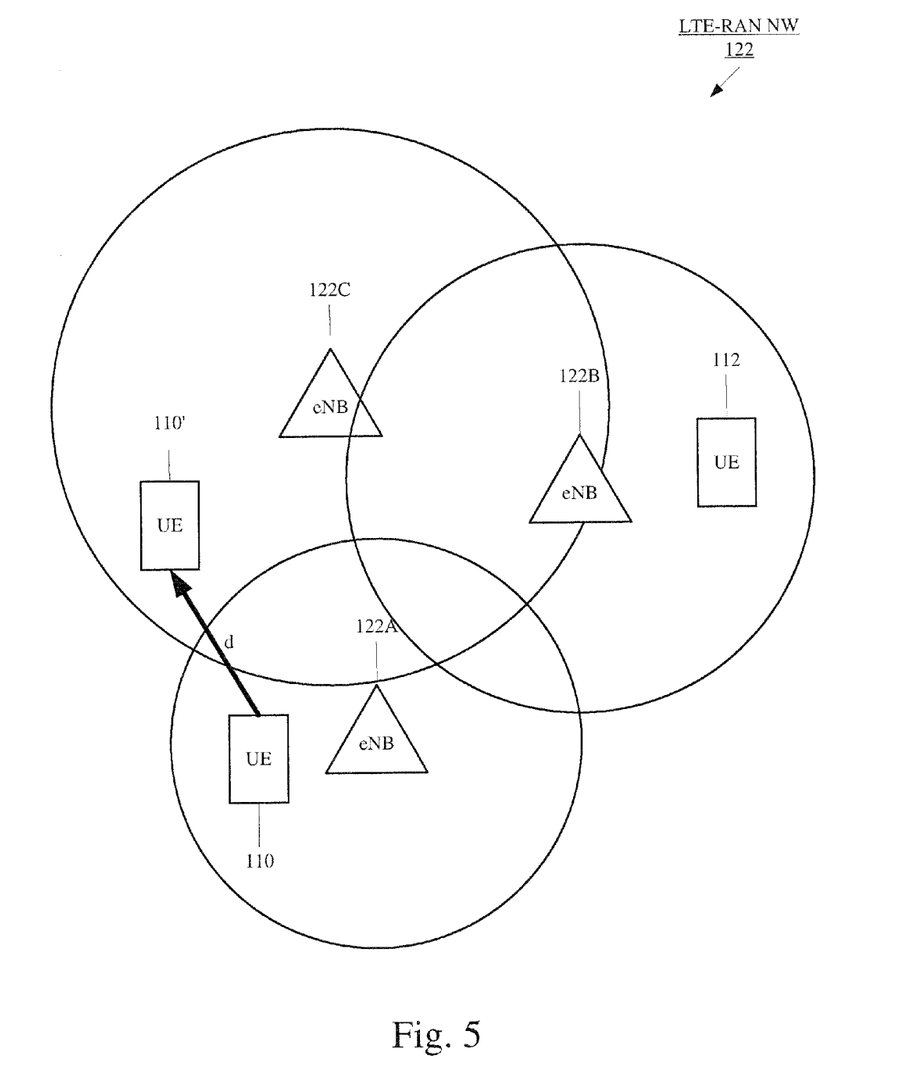
FIG. 5 shows an exemplary LTE network arrangement.

FIG. 5 shows an exemplary LTE network arrangement 122. The LTE-RAN 122 may represent a specific embodiment of the network arrangement 100 in which the UE 110 is performing a VoLTE call with the UE 112. As was used in the above description, the UE 110 may be associated with the eNB 122A while the UE 112 may be associated with the eNB 122B. However, in this exemplary embodiment, the UE 110 may move a distance d to a position UE 110' which is outside the operating area of the eNB 122A but within the operating area of the eNB 122C. Accordingly, the UE 110 has performed a roam from the eNB 122A to the eNB 122C.

Figure 6:
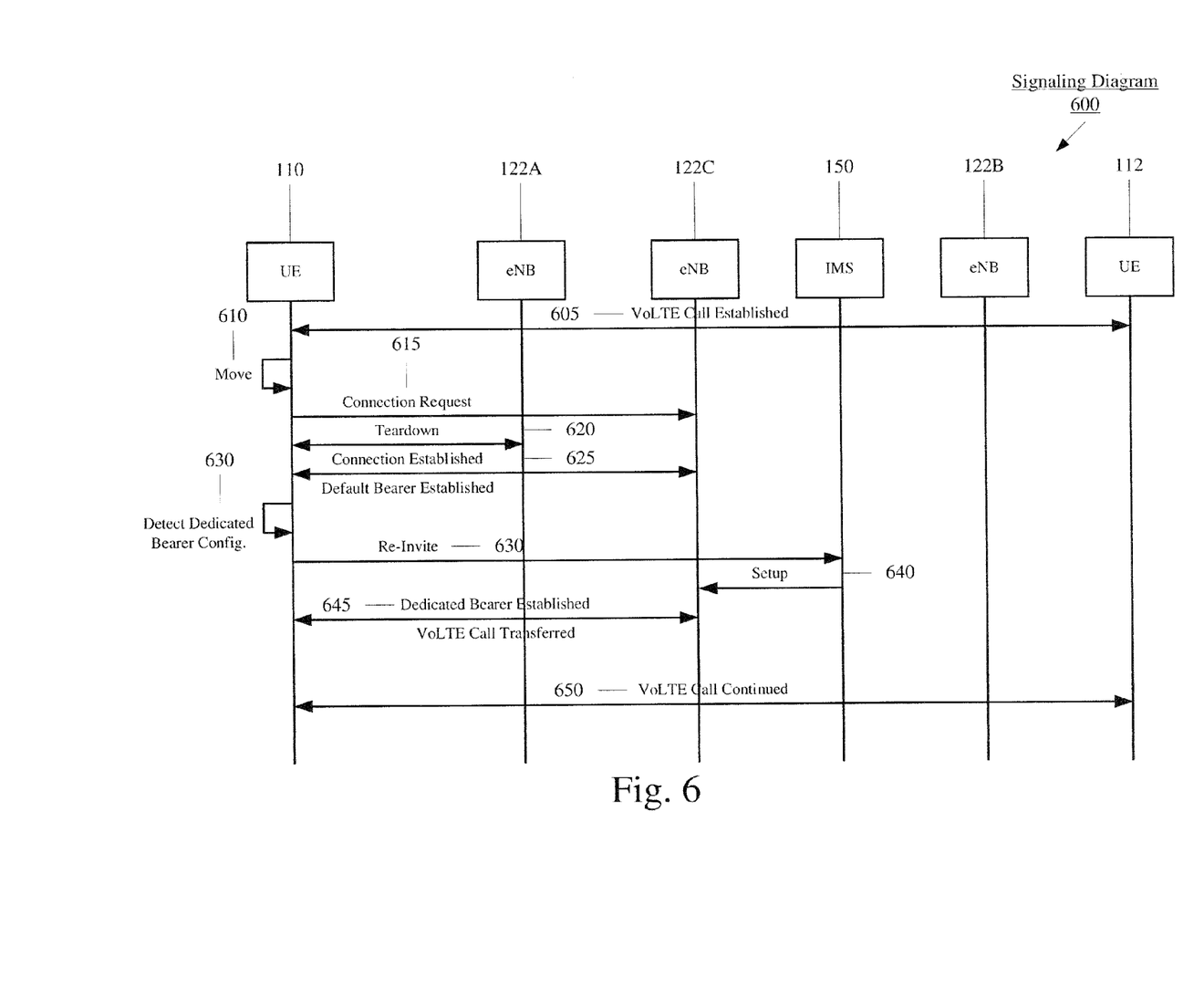
FIG. 6 shows an exemplary signaling diagram for establishing a further dedicated bearer.

FIG. 6 shows an exemplary signaling diagram 600 for establishing a further dedicated bearer. Specifically, the signaling diagram 600 relates to when the UE 110 executes the VoLTE handover application 250. Accordingly, the signaling diagram 600 further relates to when the UE 110 experiences a roam that may result in an original dedicated bearer linked to an original default bearer being lost dependent upon operating parameters of the original eNB and the roamed eNB. The signaling diagram 600 will be described with regard to the specific embodiment shown in FIG. 5. It may be assumed that the UE 112 does not experience any conditions that result in a loss of its dedicated bearer on its end such that the VoLTE handover application 250 is capable of maintaining the call continuity.

The signaling diagram 600 begins with the VoLTE call already being established 605. The signaling diagram 600 also begins with the UE 110 being associated with the eNB 122A while the UE 112 is associated with the eNB 122B. Substantially similar operations may be performed as described above with regard to the signaling diagram 300 of FIG. 3 and the signaling diagram 400 of FIG. 4.

At a subsequent time, the UE 110 may move 610 such as from the operating area of the eNB 122A to the operating area of the eNB 122C. During this transition, the UE 110 may perform a roam procedure in which a connection request 615 is transmitted to the eNB 122C while a teardown procedure 620 is performed with the eNB 122A. Upon the connection 625 to the eNB 122C is accomplished, a new default bearer may be established for the UE 110. The VoLTE handover application 250 may be configured to trigger the LTE-RAN 122 to setup a dedicated bearer at the roamed eNB 122C when the dedicated bearer at the original eNB 122A is lost after handover due to the roam. In this manner, the VoLTE call may be successfully transferred so that voice data of the VoLTE call may continue to be transmitted via the dedicated bearer.

When the handover is completed and the UE 110 is now associated with the eNB 122C, the RRC connection with the signaling radio bearer (SRB) and the dedicated radio bearer (DRB) for the default bearer may be established with the roamed eNB 122C. The VoLTE handover application 250 may detect whether the dedicated bearer for the eNB 122C is configured 630. If the dedicated bearer of the eNB 122C is not configured (e.g., based upon the signaling), the dedicated bearer being used for the VoLTE call may be lost and the LTE-RAN 122 may release the dedicated bearer for the UE 110 such that the VoLTE call is dropped. However, the VoLTE handover application 250 may be configured to transmit a re-invite message 635 to the IMS 150 with the proper parameters. Specifically, the re-invite message 635 may be a SIP message re-invite. In a substantially similar manner discussed above, the SIP message re-invite 635 may trigger the LTE-RAN 122 (e.g., the LTE core network) to set up 640 the dedicated bearer at the roamed eNB 122C. Once the dedicated bearer at the roamed eNB 122C is established 645, the UE 110 may switch the VoLTE call data to the newly established dedicated bearer. Therefore, the VoLTE call continuity 650 may be maintained after a handover is performed.

It should be noted that the above examples of FIGS. 5 and 6, it was considered that the UE 110 performed a roaming procedure to associate with a different eNB. However, those skilled in the art will understand that the UE 110 may associate with a different eNB via a handover that does not include performing a roaming procedure. Thus, the mechanism described above for maintaining VoLTE call continuity may also be used in situations where a handover occurs without any roaming procedure being used, i.e., the above procedure may be used for any handover scenario.

The above exemplary embodiments illustrate the various mechanisms that the UE 110 may be configured with which to maintain VoLTE call continuity. The mechanisms enable the LTE-RAN 122 and its components such as the eNBs 122A, 122B, 122C to be prepared. Accordingly, dedicated bearers that are being used for the VoLTE call may be kept and not released for a reestablishment procedure to be performed and dedicated bearers that will be used for the VoLTE call may be triggered for use in a preparatory manner. It should be noted that the mechanisms described herein are only exemplary. The exemplary embodiments may incorporate other mechanisms that ensure or increase a probability that the call continuity is maintained. Furthermore, the exemplary embodiments relating to the VoLTE call is only exemplary as the call continuity being maintained may be applied to any real-time communication.

Figure 7:
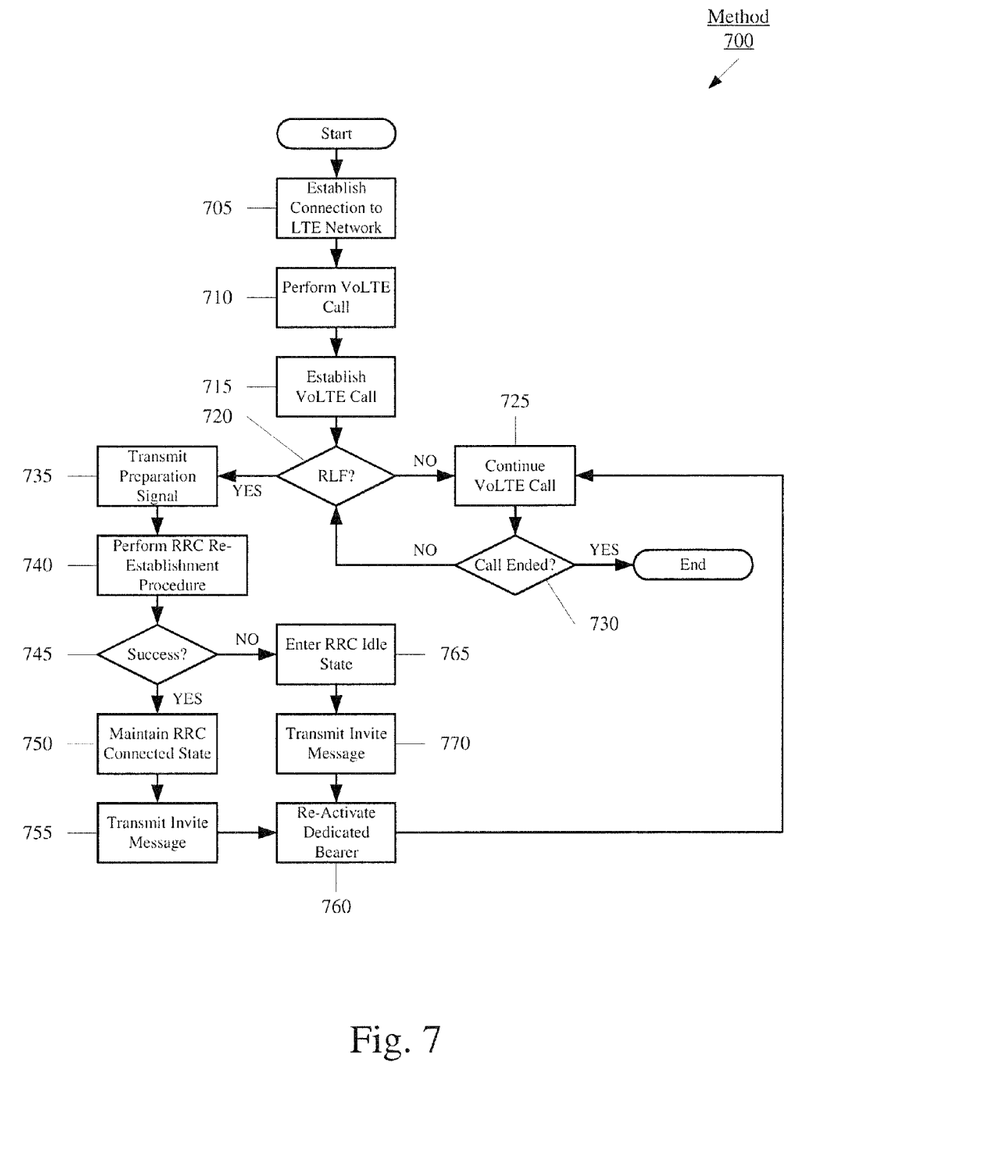
FIG. 7 shows a first exemplary method for re-activating a dedicated bearer when experiencing a radio link failure.

FIG. 7 shows a first exemplary method 700 for re-activating a dedicated bearer when experiencing a RLF. Specifically, the method 700 relates to when the UE 110 executes the reestablishment application 240 when the UE 110 experiences the RLF that results in the dedicated bearer to be lost. Again, it may be assumed that the UE 112, which is the other party to the VoLTE call, is not experiencing any conditions that potentially result in its dedicated bearer to be lost. The method 700 will be described with regard to the UE 110. The method 700 will be described with reference to the network arrangement 100 of FIG. 1, the UE 200 of FIG. 2, and the signaling diagram 300 of FIG. 3.

In step 705, the UE 110 establishes a connection to the LTE-RAN 122. As discussed above, the UE 110 may perform an association procedure with the eNB 122A when in the operation area thereof. The association procedure may include an exchange of signals that authorizes the UE 110. Once the connection to the eNB 122A and the LTE-RAN 122 is established, the eNB 122A may assign at least one default bearer having a unique IP address to the UE 110 which is used for the exchange of data. One such functionality includes a VoLTE call. In step 710, the UE 110 performs the VoLTE call and in step 715, the VoLTE call is established with the UE 112 (which is also connected to the LTE-RAN 122 having its own default bearer assigned by eNB 122B). When the VoLTE call is established, the eNB 122A assigns a dedicated bearer that is linked to the default bearer for use by the UE 110 to exchange VoLTE call data such as voice.

During the VoLTE call, in step 720, the UE 110 determines whether a RLF is detected. As discussed above, the UE 110 may be configured to detect the RLF that may occur under any number of conditions or reasons. If no RLF is detected, the UE 110 continues the method 700 to step 725. In step 725, the VoLTE call is continued. In step 730, the UE 110 determines whether the VoLTE call has ended. If not ended, the UE 110 returns the method to step 720.

If the UE 110 determines that the RLF is detected, the UE 110 continues the method to step 735. In step 735, the reestablishment application 240 of the UE 110 generates a preparation signal to be transmitted to the eNB 122A. As discussed above, the preparation signal indicates to the eNB 122A that the dedicated bearer for the UE 110 is to be kept and not released. The preparation signal may be transmitted at any time prior to the expiry of a timeout period that would otherwise result in the dedicated bearer being released and/or the VoLTE call from being dropped.

In step 740, the UE 110 performs RRC reestablishment procedures upon detecting the RLF. As discussed above, the RRC reestablishment procedures may entail a variety of operations to resolve the UE context with the eNB 122A. In step 745, the UE 110 determines whether the RRC reestablishment procedures are successful. When the UE context has been restored, the RRC reestablishment procedures are successful.

If the RRC reestablishment procedures are successful, the UE 110 continues the method 700 to step 750. In step 750, the RRC connected state is maintained. In the maintained RRC connected state, the reestablishment application 240 indicates to the UE 110 that a SIP message invite is to be transmitted to the IMS 150 which triggers the LTE-RAN 122 to continue the context for the UE 110. In this manner, in step 760, the dedicated bearer is re-activated. If the RRC reestablishment procedures fail, the UE 110 continues the method 700 from step 745 to step 765. In step 765, the UE 110 enters the RRC idle state. In the RRC idle state, the reestablishment application 240 indicates to the UE 110 that a SIP message invite is to be transmitted to the IMS 150 which triggers the LTE-RAN 122 to perform the RRC connection request. In this manner, in step 760, the dedicated bearer is re-activated. With the dedicated bearer re-activated prior to the expiry of any timeout period, the VoLTE call may continue.

Figure 8:
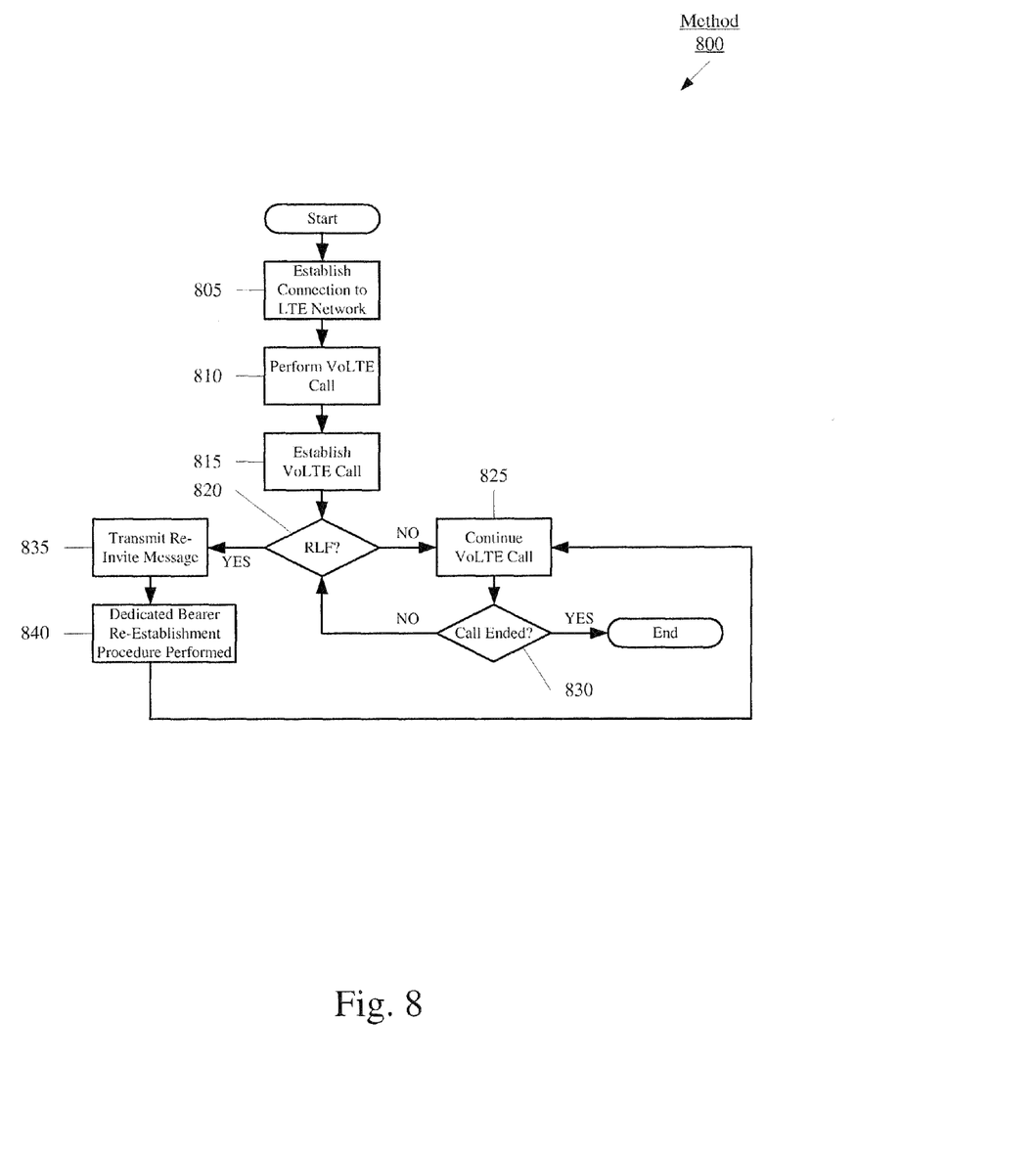
FIG. 8 shows a second exemplary method for re-activating a dedicated bearer when experiencing a radio link failure.

FIG. 8 shows a second exemplary method 800 for re-activating a dedicated bearer when experiencing a RLF. Specifically, the method 800 relates to when the UE 110 executes the bearer loss application 245 when the UE 110 detects that the UE 112 may be experiencing the RLF that results in the dedicated bearer to be lost. Again, it may be assumed that the UE 110 is not experiencing any conditions that potentially results in its dedicated bearer to be lost. The method 700 will be described with regard to the UE 110. The method 800 will be described with reference to the network arrangement 100 of FIG. 1, the UE 200 of FIG. 2, and the signaling diagram 400 of FIG. 4.

Steps 805-815 relate to establishing a connection to the LTE-RAN 122, performing a VoLTE call, and establishing the VoLTE call, respectively. Accordingly, these steps may be substantially similar to those described above with regard to step 705-715 of the method 700 of FIG. 7. In step 820, the UE 110 determines whether the UE 112 has experienced a RLF based upon a predetermined timer that is less than a RTP timer. If no downlink RTP packets are received within the predetermined timer, the bearer loss application 245 of the UE 110 may assume that the UE 112 has experienced the RLF and has lost its dedicated bearer. If the bearer loss application 245 does not detect the RLF of the UE 112, the UE 110 continues the method 800 to step 825 where the VoLTE call is continued. In step 830, the UE 110 determines whether the VoLTE call has ended and if not ended, returns to step 820.

If the bearer loss application 245 determines that the UE 112 has experienced the RLF from not receiving any downlink RTP packets within the predetermined timer, the UE 110 continues the method 800 to step 835. In step 835, the bearer loss application 245 indicates to the UE 110 that a SIP message re-invite is to be transmitted to the IMS 150. This transmission may enable the IMS 150 to trigger a dedicated bearer reestablishment procedure for the UE 112. Thus, in step 840, the dedicated bearer reestablishment procedure is performed for the dedicated bearer for the UE 112 to be re-activated. With the dedicated bearer re-activated prior to the expiry of any timeout period, the VoLTE call may continue.

Figure 9:
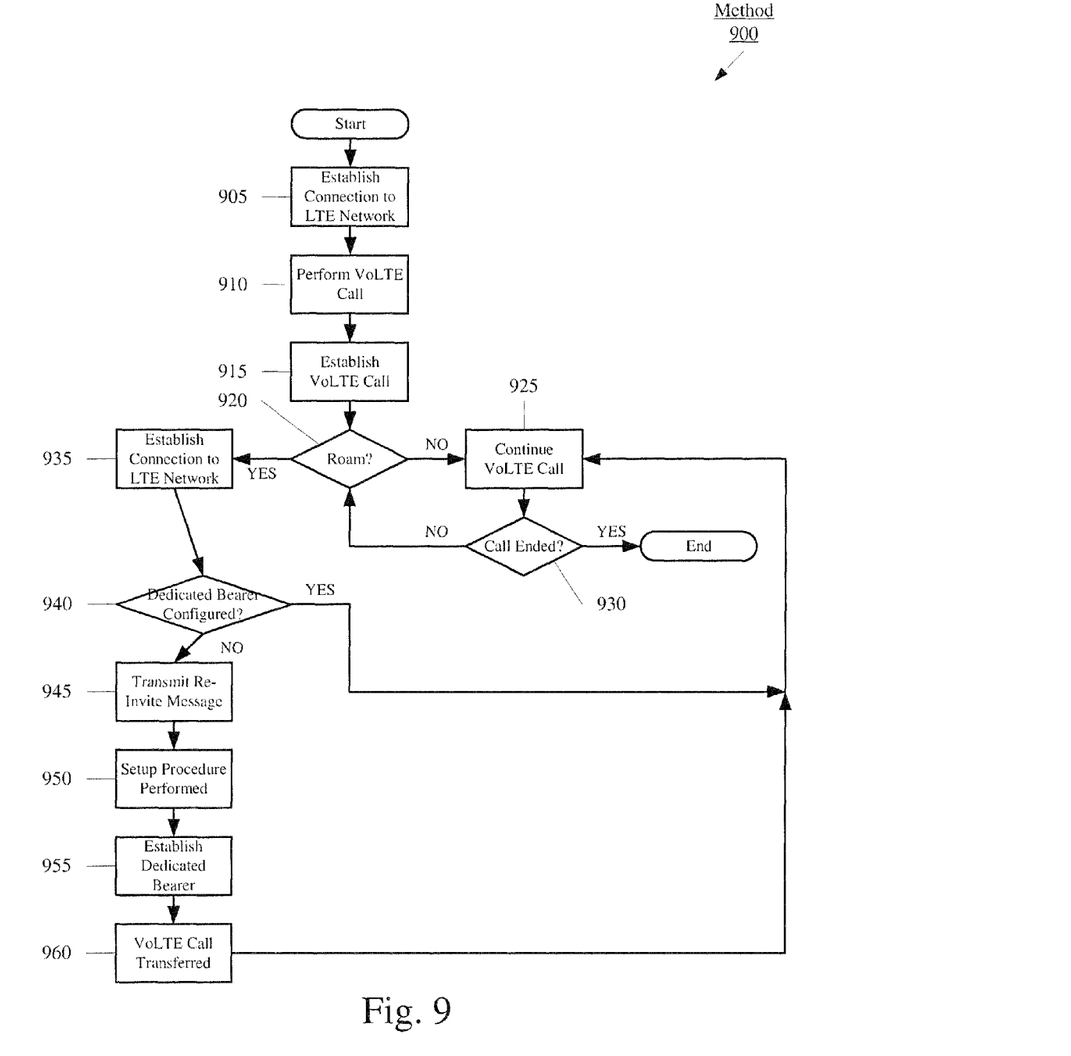
FIG. 9 shows an exemplary method for transferring a VoLTE call upon experiencing a roam.

FIG. 9 shows an exemplary method 900 for transferring a VoLTE call upon experiencing a roam. Specifically, the method 900 relates to when the UE 110 executes the VoLTE handover application 250 when the UE 110 experiences a roam in which an original dedicated bearer is lost from the handover and a new dedicated bearer is established with the roamed eNB. Again, it may be assumed that the UE 112 which is the other party to the VoLTE call is not experiencing any conditions that potentially results in its dedicated bearer to be lost. The method 700 will be described with regard to the UE 110. The method 900 will be described with reference to the network arrangement 100 of FIG. 1, the UE 200 of FIG. 2, the LTE-RAN 122 of FIG. 5, and the signaling diagram 600 of FIG. 6.

Steps 905-915 relate to establishing a connection to the LTE-RAN 122, performing a VoLTE call, and establishing the VoLTE call, respectively. Accordingly, these steps may be substantially similar to those described above with regard to step 705-715 of the method 700 of FIG. 7. In step 920, the UE 110 determines whether a roam is being performed. If no roam is performed, the UE 110 continues the method 900 to step 925 where the VoLTE call is continued. In step 930, the UE 110 determines whether the VoLTE call has ended and if not ended, returns to step 920. The UE 110 may determine a roam based upon a variety of factors such as positioning information and movement information. Thus, when the roam occurs, the UE 110 may move out of an operating area of the original eNB 122A and into an operating area of the roamed eNB 122C. As such, the default bearer from the original eNB 122A may be lost including any linked dedicated bearers while a new default bearer is established with the roamed eNB 122C. When the roam is determined, the UE 110 continues the method to step 935.

In step 935, the UE 110 establishes a connection to the LTE-RAN 122 via the roamed eNB 122C. Again, upon associating with the roamed eNB 122C, a new default bearer may be assigned by the eNB 122C and established for the UE 110. In step 940, the VoLTE handover application 250 determines whether the eNB 122C has a dedicated bearer configured based upon signaling information received during the association process. If the dedicated bearer is already configured, the UE 110 continues the method to step 925 as the VoLTE call may continue.

However, if the VoLTE handover application 250 determines that the eNB 122C does not have the dedicated bearer configured, the UE 110 continues the method 900 to step 945. In step 945, the VoLTE handover application 250 indicates to the UE 110 that the SIP message re-invite is to be transmitted to the IMS 150. The SIP message re-invite may indicate to the IMS 150 that a setup procedure is to be performed by the eNB 122C. Thus, in step 950, the setup procedure is performed. In step 955, the new dedicated bearer for the UE 110 from the roamed eNB 122C is established. In step 960, the VoLTE call is transferred to the new dedicated bearer. With the dedicated bearer being established prior to the expiry of any timeout period, the VoLTE call may continue.

The exemplary embodiments provide a system and method of maintaining a VoLTE call continuity when a dedicated bearer has been determined to be lost or when a dedicated bearer has a high probability of being lost. In a first example, the UE has experienced a RLF so that the dedicated bearer is lost. The exemplary embodiments transmit a preparation signal to indicate to the LTE network to keep the dedicated bearer and not release it so that a subsequent action may re-activate the dedicated bearer for the VoLTE call to continue. In a second example, the UE may determine that no downlink RTP packets have been received from the other UE within a predetermined timer. The exemplary embodiments may provide a mechanism for the UE to assume that this lack of RTP packets within the predetermined timer is indicative of the other UE having experienced a RLF and lost its dedicated bearer. The exemplary embodiments transmit a SIP message re-invite to trigger a connection request and re-activate the dedicated bearer for the other UE. In a third example, the UE may roam and lose its original dedicated bearer. If the UE determines that the roamed eNB does not have a configured dedicated bearer, the exemplary embodiments are configured to transmit a SIP message re-invite for a setup procedure to be performed and establish a dedicated bearer for the UE and the roamed eNB.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A system, comprising:
a first user equipment (UE) configured to perform a Voice over Long Term Evolution (LIE) (VoLTE) call;
a second UE configured to perform the VoLTE call with the first UE;
wherein the first UE is configured to maintain continuity of the VoLTE call by:
determining when one of a first dedicated bearer linked to a first default bearer of the first UE or a second dedicated bearer linked to a second default bearer of the second UE is lost; and
transmitting a signal to an Internet Protocol (IP) Multimedia Subsystem (IMS) server that prevents release of the determined dedicated bearer, the signal further triggering a re-activation of the determined dedicated bearer.

2. A user equipment, comprising:
a transceiver configured to establish a connection with a Long Term Evolution (LTE) Network; and
a processor configured to execute a Voice over LTE (VoLTE) call application with a further user equipment,
wherein the transceiver and processor are configured to maintain continuity of the VoLTE call by:
determining when one of a first dedicated bearer linked to a first default bearer of the user equipment and a second dedicated bearer linked to a second default bearer of the further user equipment is lost; and
transmitting a signal to an Internet Protocol (IP) Multimedia Subsystem (IMS) server that holds the determined dedicated bearer from release, the signal further triggering a re-activation of the determined dedicated bearer.

3. The user equipment of claim 2, wherein one of the first or second dedicated bearers are lost from a radio link failure (RLF).

4. The user equipment of claim 2, wherein, when the first dedicated bearer is determined to be lost, the user equipment is further configured to perform a Radio Resource Control (RRC) reestablishment procedure.

5. The user equipment of claim 4, wherein, when the RRC reestablishment procedure succeeds, the user equipment remains in a RRC connected state to transmit the signal to the IMS server.

6. The user equipment of claim 4, wherein, when the RRC reestablishment procedure fails, the user equipment enters a RRC idle state and transmits the signal to the IMS server, the signal triggering a RRC connection request.

7. The user equipment of claim 4, wherein the signal is a Session Initiation Protocol (SIP) message invite.

8. The user equipment of claim 2, wherein, when the second dedicated bearer is determined to be lost, the user equipment is configured to determine whether downlink (DL) Real-time Transport Protocol (RTP) packets have been received within a predetermined timer.

9. The user equipment of claim 8, wherein the predetermined timer is less than a RTP timer between six and ten seconds.

10. The user equipment of claim 8, wherein the signal is a SIP message re-invite including proper parameter information associated with the VoLTE call, the signal triggering a dedicated bearer reestablishment procedure for the second UE.

11. A method comprising:
at a first user equipment (UE) configured to perform a Voice over Long Term Evolution (LTE) (VoLTE) call with a second UE:
  determining when one of a first dedicated bearer linked to a first default bearer of the first UE or a second dedicated bearer linked to a second default bearer of the second UE is lost; and
  transmitting a signal to an Internet Protocol (IP) Multimedia Subsystem (IMS) server that delays release of the determined dedicated bearer, the signal further triggering a re-activation of the determined dedicated bearer, the re-activation of the determined dedicated bearer maintaining continuity of the VoLTE call.

12. The method of claim 11, wherein, when the first dedicated bearer is determined to be lost, the method further comprises:
performing a Radio Resource Control (RRC) reestablishment procedure.

13. The method of claim 12, wherein, when the RRC reestablishment procedure succeeds, the first UE remains in a RRC connected state to transmit the signal to the IMS server.

14. The method of claim 12, wherein, when the RRC reestablishment procedure fails, the first UE enters a RRC idle state and transmits the signal to the IMS server, the signal triggering a RRC connection request.

15. The method of claim 12, wherein the signal is a Session Initiation Protocol (SIP) message invite.

16. The method of claim 11, wherein, when the second dedicated bearer is determined to be lost, the method further comprises:
determining whether downlink (DL) Real-time Transport Protocol (RTP) packets have been received within a predetermined timer.

17. The method of claim 16, wherein the predetermined timer is less than a RTP timer between six and ten seconds.

18. The method of claim 16, wherein the signal is a SIP message re-invite including proper parameter information associated with the VoLTE call, the signal triggering a dedicated bearer reestablishment procedure for the second UE.

19. A method, comprising:
at a first user equipment (UE) configured to perform a Voice over Long Term Evolution (LTE) (VoLTE) call with a second UE:
performing the VoLTE call with the second UE using a first dedicated bearer linked to a first default bearer associated with a first evolved Node B (eNB) of the LTE network;
establishing a connection to the LTE network via a second eNB, the second eNB assigning a second default bearer to the first UE;
determining that the second eNB has not configured a second dedicated bearer linked to the second default bearer for the first UE;
transmitting a signal to an Internet Protocol (IP) Multimedia Subsystem (IMS) server that triggers a setup procedure for the second eNB to establish the second dedicated bearer for the first UE, the establishment of the second dedicated bearer maintaining a VoLTE call continuity.

20. The method of claim 19, further comprising:
roaming to the second eNB of the LTE network.

* * * * *

UNITED STATES PATENT AND TRADEMARK OFFICE
CERTIFICATE OF CORRECTION

PATENT NO. : 9,949,311 B2  
APPLICATION NO. : 14/604351  
DATED : April 17, 2018  
INVENTOR(S) : Zhao et al.

Page 1 of 1

It is certified that error appears in the above-identified patent and that said Letters Patent is hereby corrected as shown below:

In the Claims

Claim 1, Column 16, Line 15:
"(LIE)" should read "(LTE)"

Signed and Sealed this
Twenty-eighth Day of May, 2019

Andrei Iancu
*Director of the United States Patent and Trademark Office*